United States Patent
Chen

(10) Patent No.: US 6,233,468 B1
(45) Date of Patent: May 15, 2001

(54) HAND-FREE SYSTEM CAPABLE OF PREVENTING A VEHICLE'S AUTOMATIC ANTENNA FROM RANDOM OPERATION

(75) Inventor: Tonny Chen, Chang-Hua (TW)

(73) Assignee: E. Lead Electronic Co., Ltd., Chang-Hua (TW)

( * ) Notice: Subject to any disclaimer, the term of this patent is extended or adjusted under 35 U.S.C. 154(b) by 0 days.

(21) Appl. No.: 09/288,648

(22) Filed: Apr. 9, 1999

(51) Int. Cl.⁷ ............................................. H04M 1/00
(52) U.S. Cl. ...................... 455/569; 455/90; 343/702; 343/713
(58) Field of Search .................... 455/90, 569, 570; 343/702, 711, 712, 713, 714, 901, 903

(56) References Cited

U.S. PATENT DOCUMENTS 5,054,115 * 10/1991 Sawa et al. ............................ 455/90
5,974,333 * 10/1999 Chen ..................................... 455/569

* cited by examiner

*Primary Examiner*—Lee Nguyen
(74) *Attorney, Agent, or Firm*—Rosenberg, Klein & Lee

(57) ABSTRACT

An improved hand-free system for use on a cellular phone, and more particularly one hand-free system can prevent an automatically-operated antenna of a vehicle's audio stereo system from being unnecessarily actuated in response to incoming signals of a cellular phone. As a cellular phone is receiving incoming signals, a vehicle's audio stereo system in operation is automatically turned off or become mute, and the received voice signals of the cellular phone are amplified and broadcast via speakers of the vehicle's audio stereo system. At the same time, the antenna of the vehicle's audio stereo system remains in its current status without being actuated till the end of the operation of a cellular phone; afterwards, the audio stereo system is automatically started again. Thereby, it not only advances the quality of communication of a cellular phone and driving safety of a vehicle but also make the operation life of an antenna of a vehicle effectively extended by reducing the number of unnecessary extensions and retractions of the antenna in use.

2 Claims, 5 Drawing Sheets

HAND-FREE SYSTEM CAPABLE OF PREVENTING A VEHICLE'S AUTOMATIC ANTENNA FROM RANDOM OPERATION

BACKGROUND OF THE INVENTION

The present invention relates to an improved hand-free system for use on a cellular phone, and more particularly to one which can prevent an automatically-operated antenna of a vehicle's audio stereo system from being unnecessarily actuated in response to incoming signals of a cellular phone. As a cellular phone is receiving incoming signals, a vehicle's audio stereo system in operation is automatically turned off or become mute, and the received voice signals of the cellular phone are amplified and broadcast via speakers of the vehicle's audio stereo system. At the same time, the antenna of the vehicle's audio stereo system remains in its current status without being actuated till the end of the operation of a cellular phone; afterwards, the audio stereo system is automatically started again. Thereby, it not only advances the quality of communication of a cellular phone and driving safety of a vehicle but also make the operation life of an antenna of a vehicle effectively extended by reducing the number of unnecessary extensions and retractions of the antenna in use.

Local civil communication markets are now opened to more and more competitors together with the domestic cellular phone markets in addition. The number of users of cellular phones is increasing in multiple times. Under such a circumstance, consumers expect more functions for a cellular phone and more kinds of peripheral equipment are designed and marketed one after the other for years. Among them hand-free systems are the most prospective products on markets all over the world. However, cellular phones are changing in functions, sizes and outer appearance rapidly to meet different consumers' requirements. Members of a family may have various kinds of cellular phones. So, a hand-free system used in a vehicle for one specific kind of cellular phone is out of date now. The inventor has already worked on a resolution for this problem and come up with a universal hand-free system applied for a patent in his previous invention.

More and more vehicles are equipped with a high level audio stereo system, which generally has an automatically operated antenna extending and retracting according to control signals. A hand-free system operated in combination with such a vehicle's audio stereo system will turn off the audio stereo system when a cellular phone is receiving incoming signals so as to permit voice signals to be transmitted by way of speakers of the vehicle's audio stereo system. If a general audio stereo system is equipped with a mute function, the audio system is set mute in that case, if it is not equipped with such a function, the power source of the audio system is to be controlled. However, most of vehicles' audio stereo systems do not have a mute function, so, the present invention resorts to the control of a power source.

As a result of the audio stereo system being turned off at the moment of the cellular phone receiving incoming signals, an automatic antenna of the vehicle is controlled to retract automatically. The antenna is extended after the operating cellular phone comes to an end with the audio stereo system turned on again. Such a repetition of extending and retracting operations on an antenna can make the operation life thereof shortened easily and also cause damage to the same readily.

SUMMARY OF THE INVENTION

Therefore, the primary object of the present invention is to provide an improved hand-free system in combination with a cellular phone. It can automatically detect the status of an antenna of a vehicle's audio stereo system and prevent the antenna from extending and retracting in response to the operation condition of a cellular phone. As a cellular phone is receiving incoming signals, the status of the antenna of a vehicle is first detected and then a control signal is issued to keep the antenna remained in its current status without any movement. Thus, it prevents the antenna from extending or retracting randomly or unnecessarily in response to signals of a cellular phone.

DETAILED DESCRIPTION OF THE PREFERRED EMBODIMENTS

Figure 1:
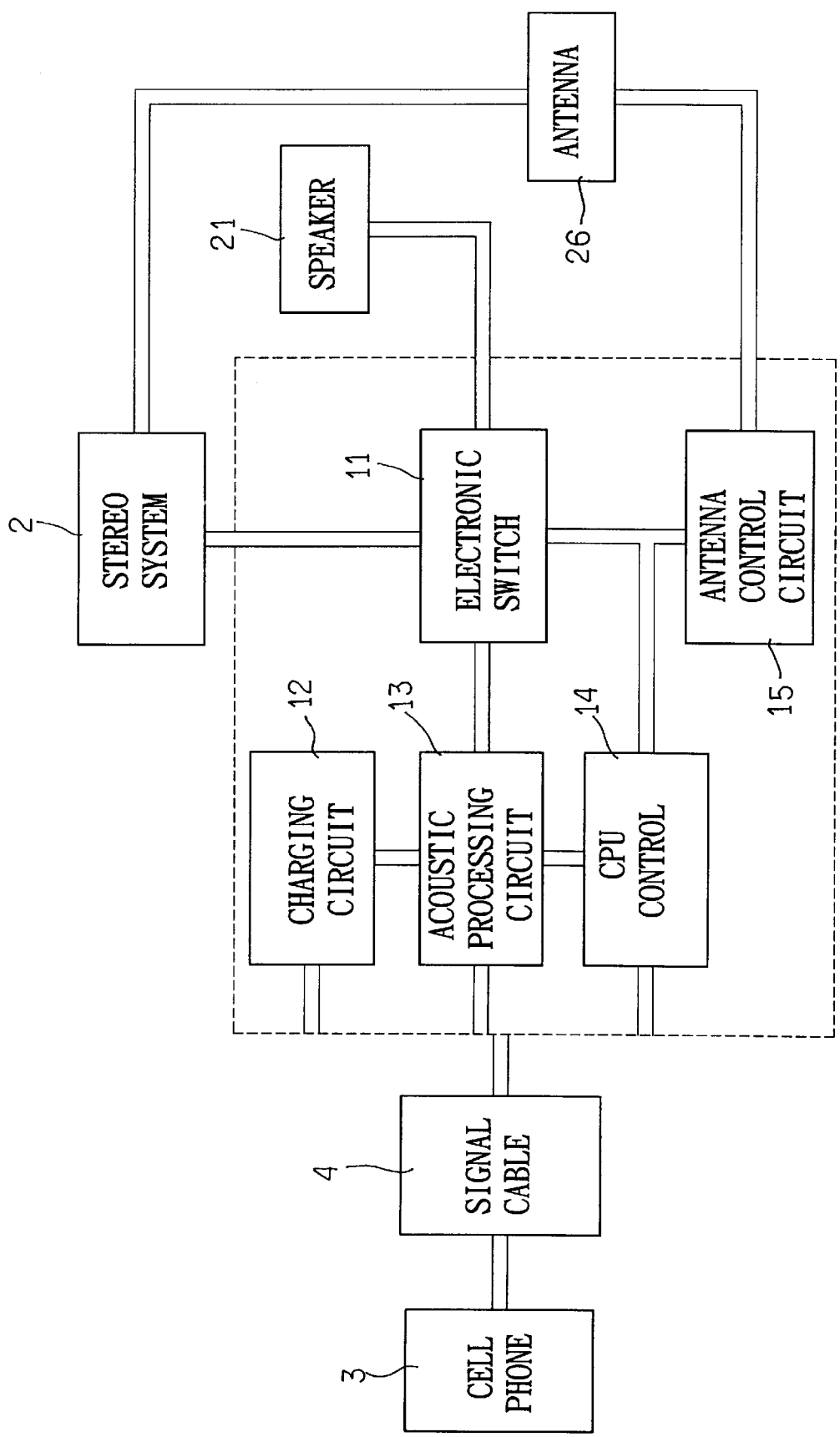
FIG. 1 is a diagram showing the present invention in combination with a vehicle's audio stereo system and a cellular phone.

Referring to FIG. 1, the hand-free system of the present invention in is used in combination with a vehicle's audio stereo system. It is comprised of an electronic switch 11, a power source and charging circuitry 12, an amplifier and acoustic quality processing circuitry 13, an acoustic source control CPU 14 and an antenna controlling circuitry 15. It operates in cooperation with an antenna of a vehicle.

The electronic switch 11 is actuated by the acoustic source control CPU 14 to set the acoustic source of speakers 21 to be either from the vehicle's audio stereo system 2 or a cellular phone 3. As the cellular phone 3 is receiving incoming signals, the vehicle's audio stereo system 2 is automatically turned off then and is automatically turned on after the operation of the cellular phone 2.

The power source and charging circuitry 12 is used to supply the cellular phone 3 with proper power and a charging source so that the battery of the cellular phone 3 can be charged at any time.

The amplifier and acoustic quality processing circuitry 13 is used to amplify the input signals of the cellular phone 3, which are delivered for use in the consecutive phonetic output with echo and noise in operation eliminated so as to reduce the loss of fidelity in signal transmission.

As a signal cable 4 is connected to both the cellular phone 3 and a hand-free system 1, signal voltages input into the acoustic source control CPU 14 are all set as one initial value (i.e. a standby value) by the acoustic source control CPU 14, no matter they being in a high HI (A1), a low LO (A2) or a consecutive serial (A3) form. As the voltage of the output signals of a cellular phone 1 is converted into incoming signals (on the standby signal being varied), a signal is sent off to control the electronic switch 11 so that the voice signals of the cellular phone 3 are output via speaker 21 with the vehicle's audio stereo system turned off at the same time.

Figure 2:
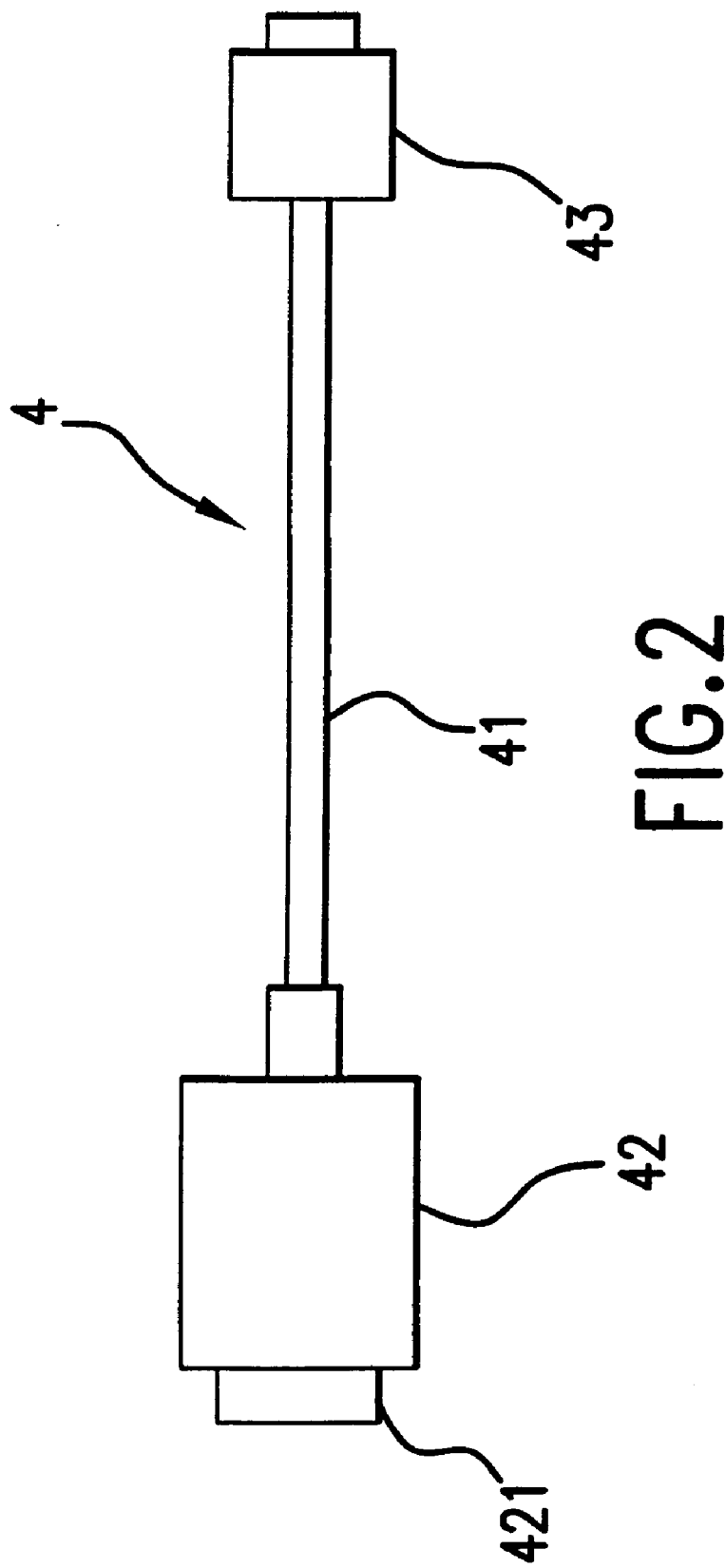
FIG. 2 is a diagram showing the signal cable of the present invention.

A signal cable 4 is a flexible cord 41, as shown in FIG. 2, having a first plug head 42 at one end in engagement with a signal output socket of a cellular phone 3. The first plug head 42 has a plurality of conducting pins 421 corresponding to the output points of the output socket of the cellular phone 3 at its front end. By way of the arrangement of the conducting pins 421 of each kind of a first plug head 42, the first plug head 42 can be adapted to different kinds output sockets of cellular phones 3. The other end of the signal cable 4 has a second plug head 43 in connection to an embodiment 1 of a hand-free system 1.

An antenna control circuitry 15 is used to detect the status of an antenna 26 when the acoustic source control CPU 14 is activated to turn off or turn on the vehicle's audio stereo system 2. Thereby it will output a control signal, if necessary, to maintain the status of an antenna 26 as the vehicle's audio stereo system is turned off.

Figure 3:
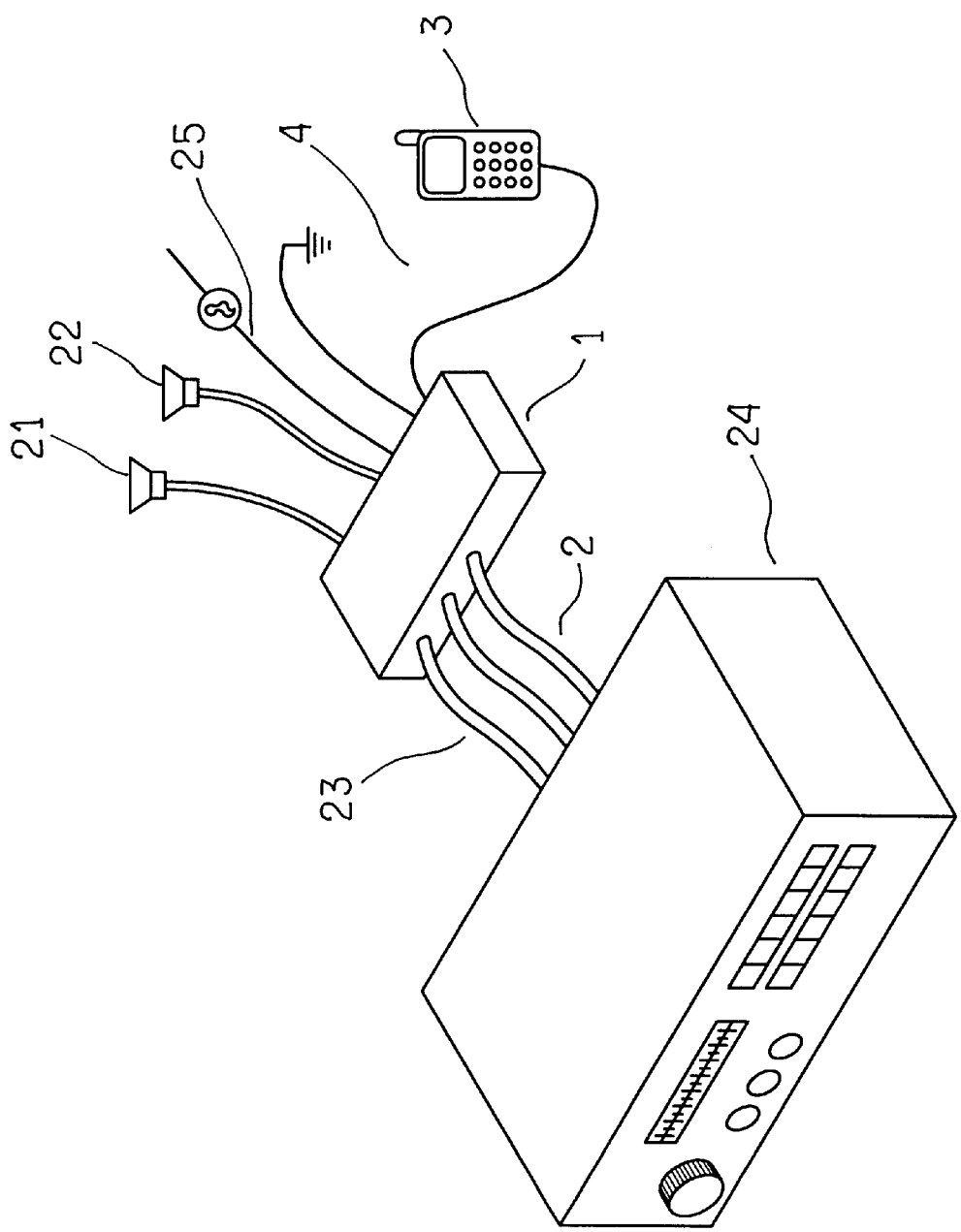
FIG. 3 is a diagram showing the practical application of the present invention.

By means of the arrangement of the above components, as shown in FIG. 3, a hand-free system can work in combination with a vehicle's audio stereo system. In operation, the embodiment 1 of the hand-free system is placed between the sound output terminal 23 of the vehicle's audio stereo system 2 and speakers 21, 22 of the audio stereo system 2 and also between a power input terminal 24 of the audio stereo system and a power source 25, avoiding problems in installation. The way of installation and structure thereof are not the main points of the present invention, they are not accounted hereinafter. As a cellular phone is receiving incoming signals, the acoustic source control CPU 14 outputs a signal to control the electronic switch 11 and the antenna control circuitry (antenna control is described later) so as to turn the vehicle's audio stereo system 2 mute or shut off the power of the audio stereo system 2 and to connect the input terminal of the speaker 21 of the audio stereo system to the embodiment 1 of the hand-free system. Thus, the incoming sound signals of the cellular phone are adjusted by the amplifier and acoustic quality processing circuitry 13, reducing loss of fidelity in communication, and is shifted to be output via the speaker 21 by the electronic switch 11. When the operation of the cellular phone 3 comes to an end, and the standby signal of the cellular phone resumes to an initial value, the acoustic control CPU 14 transmits a control signal to the electronic switch 11 to shift the output acoustic source from the amplifier and acoustic quality processing circuitry 13 to the vehicle's audio stereo system 2.

Figure 4:
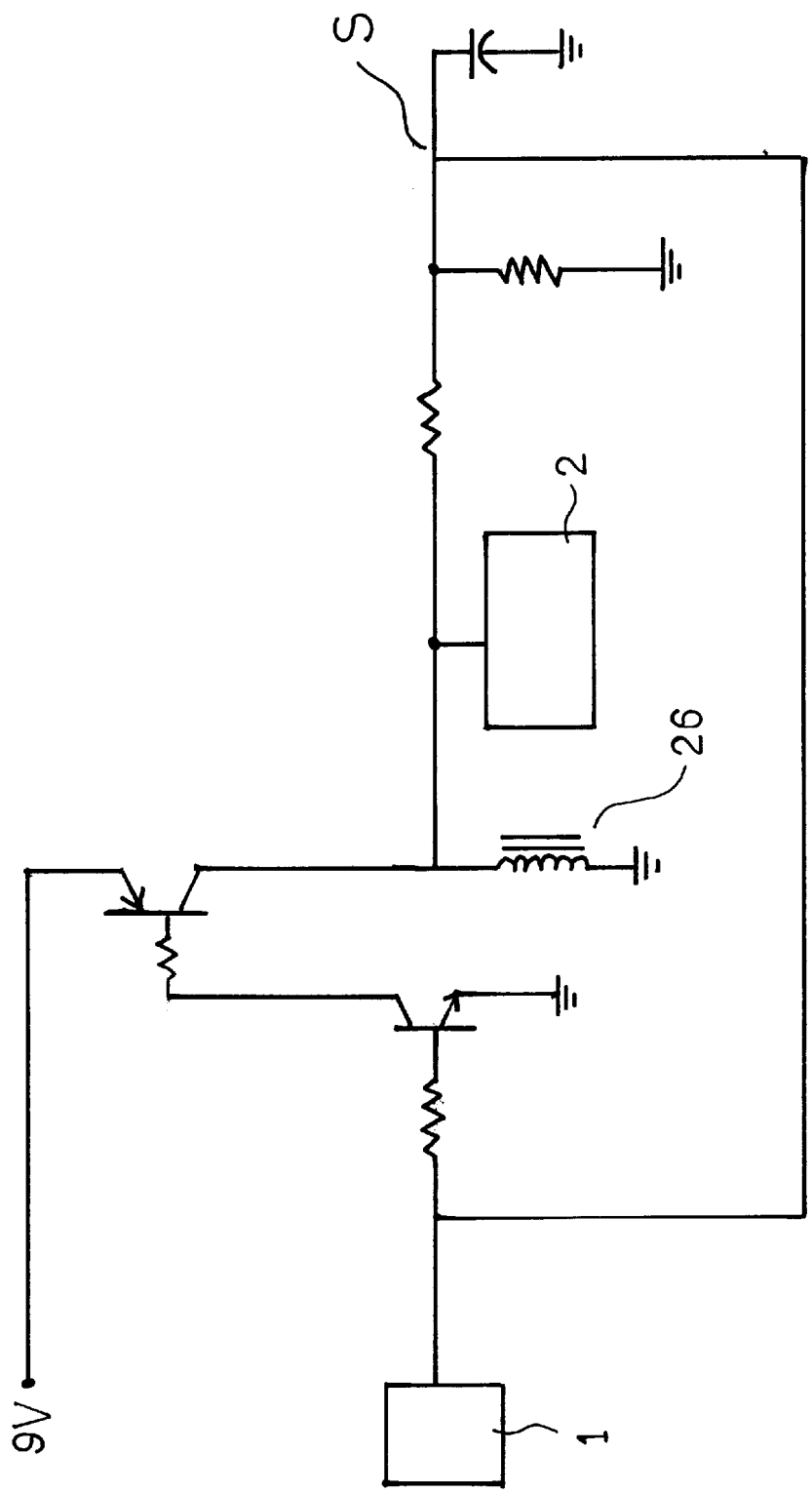
FIG. 4 is a diagram showing a circuitry of the present invention used for detection of the operation of a vehicle's antenna.

From the proceeding account, it becomes clear how incoming signals of a cellular phone are transformed and are output via a vehicle's audio stereo system. As to the operation of the antenna of a vehicle, FIG. 4 is referred to. In general, automatic antennas are independent of its power source and they are activated to extend or retract by control signals, which are issued from a vehicle's audio stereo system 2 to control a relay or other control mechanism. That is a basic principle on which an automatic antenna is operated. So, as a cellular phone 3 is receiving incoming signals, the acoustic source control CPU 14 will transmit a control signal to the antenna control circuitry 15, i.e., the node S which detects the antenna 26 to be in a lifting or lowing status. Afterwards, a signal is issued to activate the relay, which is responsible for the control of the operation of the antenna 26 to maintain its current status. Then, the electronic switch 11 turns off the vehicle's audio stereo system 2 so as to prevent the automatically operated antenna 26 from being repeatedly extended and retracted in response to the temporary turning off of the audio stereo system 2.

Figure 5:
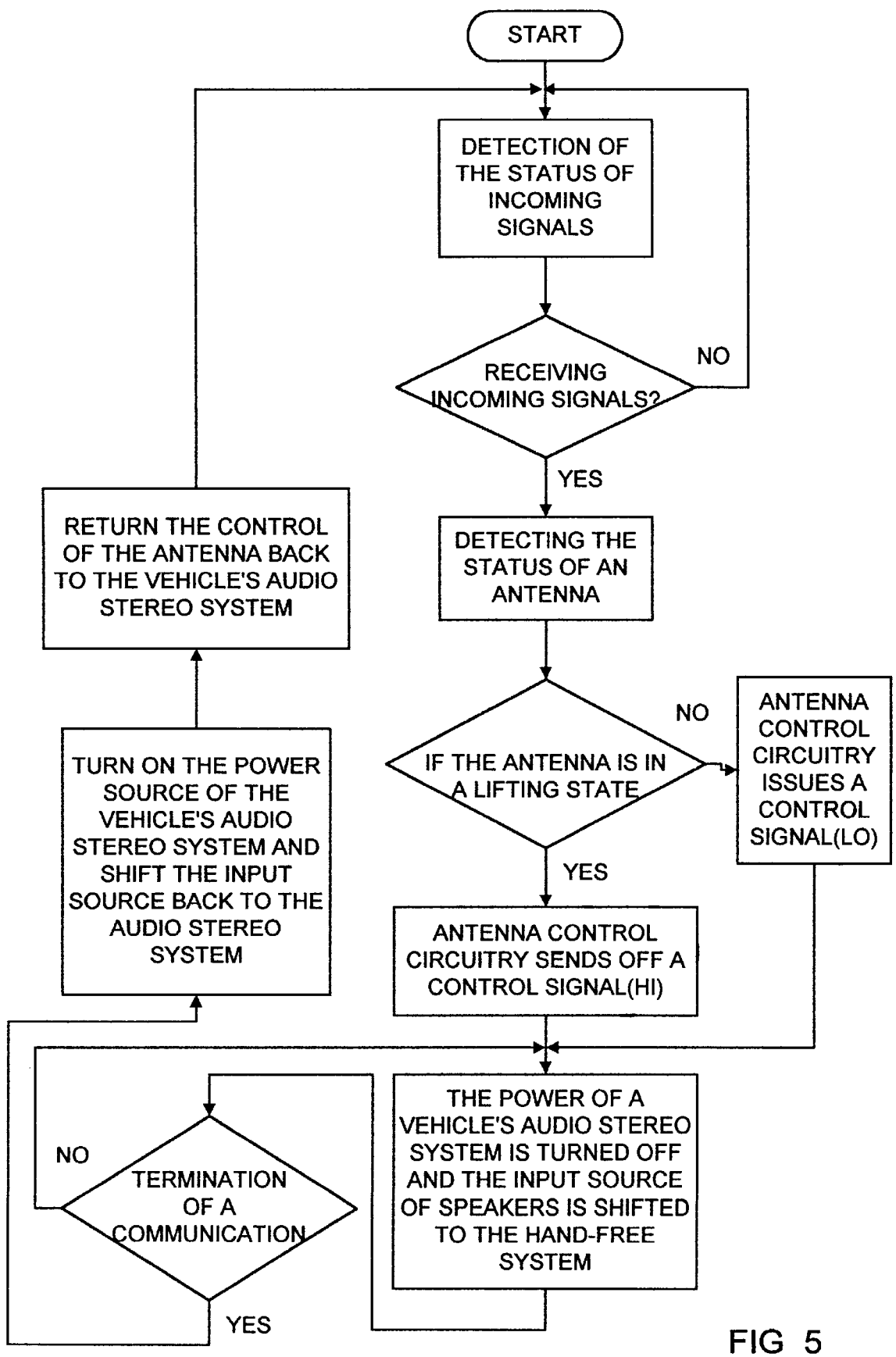
FIG. 5 is a flow chart showing the control of a vehicle's antenna by way of the present invention.

Referring to FIG. 5, the summary of the above procedures as follows:
1. Detecting the status of incoming signals.
2. If acoustic source control CPU 14 identifies the signals to be a cellular phone's incoming signals, then it sends off a signal to the antenna control circuitry 15 which monitors the status of the antenna.
3. If the antenna control circuitry 15 detects the antenna 26 to be in a lifting state, it outputs a control HI signal (i.e. a control voltage) to keep the antenna relay on operation (i.e. obtaining a control signal); otherwise, a LO signal (i.e. a cut-off) is output.
4. The electronic switch 11 turns off the vehicle's audio stereo system and connects the input terminal of the speaker 21 of the vehicle's audio stereo system to the embodiment 1 of the hand-free system 1, permitting the incoming voice signals to be adjusted by the amplifier and acoustic quality processing circuitry 13 to reduce the loss of fidelity of voice signals, and then output by way of the speaker 21.
5. At the end of the communication, the electronic switch 11 turns on the power of the vehicle's audio stereo system again and shifts the acoustic source back to the audio stereo system 2.
6. The antenna control circuitry 15 stops output control signals and turns the control priority to the vehicle's audio stereo system 2.
7. The procedures terminate and the step 1 is restarted.

The antenna control circuitry of the present invention can be independently produced in a standard kit for adaptation to all kinds of hand-free systems. It is not limited to the hand-free system cited in the present invention.

I claim:

1. A hand-free system for use on a cellular phone being operated in combination with a vehicle's audio stereo system, capable of preventing a vehicle's automatically operated antenna from being randomly extended or retracted in correspondence to operation conditions of a cellular phone, comprising an electronic switch, a power source and charging circuitry, an amplifier and acoustic quality processing circuitry, an acoustic source control CPU and an antenna controlling circuitry, and said operating in cooperation with an antenna of a vehicle; wherein said hand-free system is characterized by that when a cellular phone is receiving incoming signals, said acoustic source control CPU will transmit a control signal to said antenna control circuitry which detects the antenna being lifted or lowered first and then send off a relay responsible for control of a lifting or lowering operation on said antenna to maintain said relay in operation; till said cellular phone terminates its communication operation, control of said antenna is returned to said vehicle's audio stereo system whereby said antenna is protected from being randomly extended and retracted in response to turn-on and turn-off operations of said vehicle's audio stereo system.

2. The hand-free system for use on a cellular phone capable of preventing a vehicle's automatic antenna from being randomly extended or retracted as claimed in claim 1 wherein said antenna control circuitry is independently produced in a standard kit for use in various kinds of embodiments of a hand-free system.

* * * * *